United States Patent [19]
Sakurai

[11] Patent Number: 6,041,305
[45] Date of Patent: Mar. 21, 2000

[54] METHOD AND APPARATUS OF CONTROLLING RESERVATION FOR GOODS AND THE LIKE

[75] Inventor: Yasuo Sakurai, Osaka, Japan

[73] Assignee: Daishin Frame Inc., Osaka, Japan

[21] Appl. No.: 08/840,068

[22] Filed: Apr. 24, 1997

[30] Foreign Application Priority Data

Apr. 25, 1996 [JP] Japan .................................. 8-105445
Nov. 20, 1996 [JP] Japan .................................. 8-309670

[51] Int. Cl.$^7$ ...................................................... G06F 17/60
[52] U.S. Cl. .................................................................. 705/5
[58] Field of Search ........................ 705/1, 5, 6; 379/84, 379/93.17

[56] References Cited

U.S. PATENT DOCUMENTS 4,255,619 3/1981 Saito ..................................... 379/93.17
5,408,518 4/1995 Yunoki ..................................... 379/84

Primary Examiner—M. Kemper
Attorney, Agent, or Firm—Jordan and Hamburg LLP

[57] ABSTRACT

A method and apparatus for controlling the reservation for goods and the like is provided includes the performance and apparatus for effecting performance of a sequence of steps. Steps including setting and registering individual identification means for each individual applicable to individual data of an unspecified number of the general public, reserving tangible and/or intangible various goods controlled by an information data control unit for an individual whose individual identification means have been set and registered through communication devices, and setting a reservation code to the reservation data for each of various goods reserved and notifying the individual are performed. Reservations modification may be effected by the steps of receiving various urgent information data such as the change or cancellation of the reservation data to which the reservation code has been set from at least either the individual side or the information data control unit side, changing or canceling the contents of the reservation data, and sending through the communication device the contents of the reservation data to notify the individual.

22 Claims, 5 Drawing Sheets

METHOD AND APPARATUS OF CONTROLLING RESERVATION FOR GOODS AND THE LIKE

BACKGROUND OF THE INVENTION

The present invention relates to a method and apparatus for controlling the reservation for goods and the like, and more particularly to a method and apparatus for controlling the reservation for goods and the like, which perform the reservation for tangible and/or intangible various goods and the like through communication means, and thereafter where there occurs a situation in that the contents and the like of various goods, such as reserved goods and services, are changed by the reserving party side, as well as even where an emergency situation, such as various troubles, occurs on the other party side for providing various goods, such as reserved goods and services, the purpose of the both parties is achieved.

Heretofore, as an art of reserving tangible and/or intangible various goods and the like, as mentioned above, there is, for example, art described in the official gazette of Japanese Patent Publication No. 6-103914.

That is, the art described in the above-mentioned official gazette, which patent was filed by the present applicant, and which field of application is not limited at all, is most suitable particularly for reserving medical examinations and the like in hospitals and the like.

Such art, when applied, for example, as a reservation system for hospitals and the like, includes the steps of: sending a reservation for the order of the date and time of visiting hospital and/or medical examination and the like for each patient, who calls the extension-line or the outside-line telephone within a hospital and the like, by an order setting computer connected to the extension-line and/or the outside-line telephones; thereafter inputting the identification data for each patient who reserved the order, on that day of reservation, into the order setting computer, thereby confining the reservation for the order of the date and time of visiting hospital and/or medical examination and the like for each patient; thereafter setting for each of the reserving patient a caller provided with calling means which can receive different electromagnetic waves for each of the patient and send an outside notification only when received a specified electromagnetic wave, and then lending the caller to the patient; and thereafter sending identification electromagnetic waves differing for each reservation order inputted into the order setting computer to respective callers provided by the patient according to the order of the date and time of visiting hospital and/or medical examination and the like for each of the reserved patient by means of an automatic calling unit connected to the order setting computer, thereby sequentially calling the calling means of the specified caller.

Thus, according to the art described in the above-mentioned official gazette, a patient or the like having reserved the order of the date and time of visiting hospital and/or medical examination and the like through an order setting computer connected to telephones can reserve a more reliable and correct order of the date and time of visiting a hospital and/or a medical examination and the like through various information regarding special medicines, such as internal medicine and surgery, sent in real time to the order setting computer, and in addition, the calling of medical examination and the like for each patient in a waiting room and the like can be reliably performed through calls supplied to the patients and through an automatic calling unit connected to the order setting computer at a precise reserved time without being affected entirely by a noisy environment in the waiting room and the like.

However, in a reservation system having the above-mentioned configuration, there have existed the following problems.

When the reservation system having the above-mentioned configuration is applied to a hospital and the like, the system has an advantage that, regardless of the size of the hospital and the like, the system can issue the reservation for the order of the date and time of visiting a hospital and/or a medical examination and the like for each patient through telephones, thereby not only reducing at least to one, or completely to none, a number of persons who belong to the hospital and the like, and who are in charge of reservation of the order of medical examination and the like, but also performing reliably the calling of the medical examination of patients and the like waiting in a waiting room and the like at a precise reservation time without being affected entirely by a noisy environment in the waiting room and the like. However, unfortunately, regardless of the field of art applied, all reservations for the order established through an order setting computer are not always established, and thus there may occur an urgent situation wherein the contents and the like of various goods, such as goods and services reserved through the order setting computer must be changed by the reserving party side, or there may occur an emergency situation, such as various troubles on the other party side providing various goods and the like, such as goods and services reserved, must be addressed without being limited to the hospital and the like receiving reservation.

Therefore, even when the reservation system of the above-mentioned configuration is applied to various fields of art without being limited to the reservation in a hospital and the like, where there occurs a situation in that various goods and the like, such as goods and services reserved, must be canceled, it is sufficient to notify the order setting computer of the effect, but, for example, where there occurs an urgent situation in that various conditions such as the contents of various goods and the like such as goods and services reserved must be changed by the reserving party side, various reservations stored and controlled in the order setting computer must be at once canceled and then a new reservation for various goods and the like must be established again, whereby there may occur a case where, if the time required for reservation becomes even somewhat longer when establishing again various reservations having different conditions, various goods and the like such as goods and services to be reserved cannot be set on the date and time initially reserved.

Further, the change of the contents of various goods and the like, such as goods and services, once reserved does not always occur only on the reserving party side, and an emergency situation, such as various troubles, may also occur on the other party side for providing various goods, such as reserved goods and services. Particularly where an emergency situation, such as various troubles, occurs on the other party side for providing various goods such as reserved goods and services, the follow up to the reserving party is still not considered to be perfect, so that, for example, there may occur a case where the reserving party is notified through a postal matter, such as postcards indicating the emergency situation, and in the worst case, the party may be notified through a reservation window or a goods receiving place of the emergency situation on that day.

Thus, even for the notification through a postal matter of the emergency situation, a loss of several days from reservation establishment occurs, and in addition, a notification of the emergency situation at a reservation window or a goods receiving place on that day may not only cause an absolute confidence for the reserving party to be lost, but may also cause a damage to be claimed particularly when reserved various goods and the like are very important goods and the like for the reserving party, whereby there has existed a very serious problem that for not only the reserving party establishing a reservation, but also the other party providing various goods such as reserved goods and services, a smooth corrective action is desirable for both the parties to the change of the contents of various reserved goods and the like and to address the emergency situation, such as various troubles. In particular the reserving party must be reliably notified in real time not only of the change of the contents of various goods and the like initially reserved, but also of the reserved contents of various goods and the like such as goods and services thereafter changed or canceled.

However, the present invention solves all the above-mentioned problems, and the object of the invention is to provide a method and apparatus of controlling the reservation for goods and the like, in which where there occurs a situation in that the contents and the like of various goods, such as reserved goods and services, are changed by the reserving party side, as well as even where an emergency situation, such as various troubles, occurs on the other party side for providing various goods such as reserved goods and services, the apparatus can achieve smoothly and reliably the purpose of the both parties in real time for 24 hours through no human power.

SUMMARY OF THE INVENTION

In accordance with the present invention, there is provided a method of controlling the reservation for goods and the like which includes the steps of setting and registering individual identification means for each individual applicable to individual data of an unspecified number of the general public, reserving tangible and/or intangible various goods and the like controlled by an information data control unit from an individual whose individual identification means have been set and registered, through communication means, setting a reservation code to the reservation data for each of various goods and the like reserved and notifying the individual, receiving various urgent information data such as the change or cancel of the reservation data to which the reservation code has been set from at least either the individual side or the information data control unit side, and changing or canceling the contents of the reservation data, and sending through the communication means the contents of the reservation data to notify the individual.

The method of the above steps has an advantage that even where an emergency situation such as various troubles occurs on the other party side for providing various goods such as reserved goods and services, the method can not only achieve reliably the purpose of the both parties through each unit in real time for 24 hours through no human power, but also particularly perform reliably the final confirmation for the reservation contents for each individual having established a reservation and central control and in real time all of reservation data on various goods and the like for each individual of an unspecified number of the general public.

The above, and other objects, features and advantages of the present invention will become apparent from the detailed description thereof read in conjunction with the accompanying drawings.

DETAILED DESCRIPTION OF THE PREFERRED EMBODIMENTS

Figure 1:
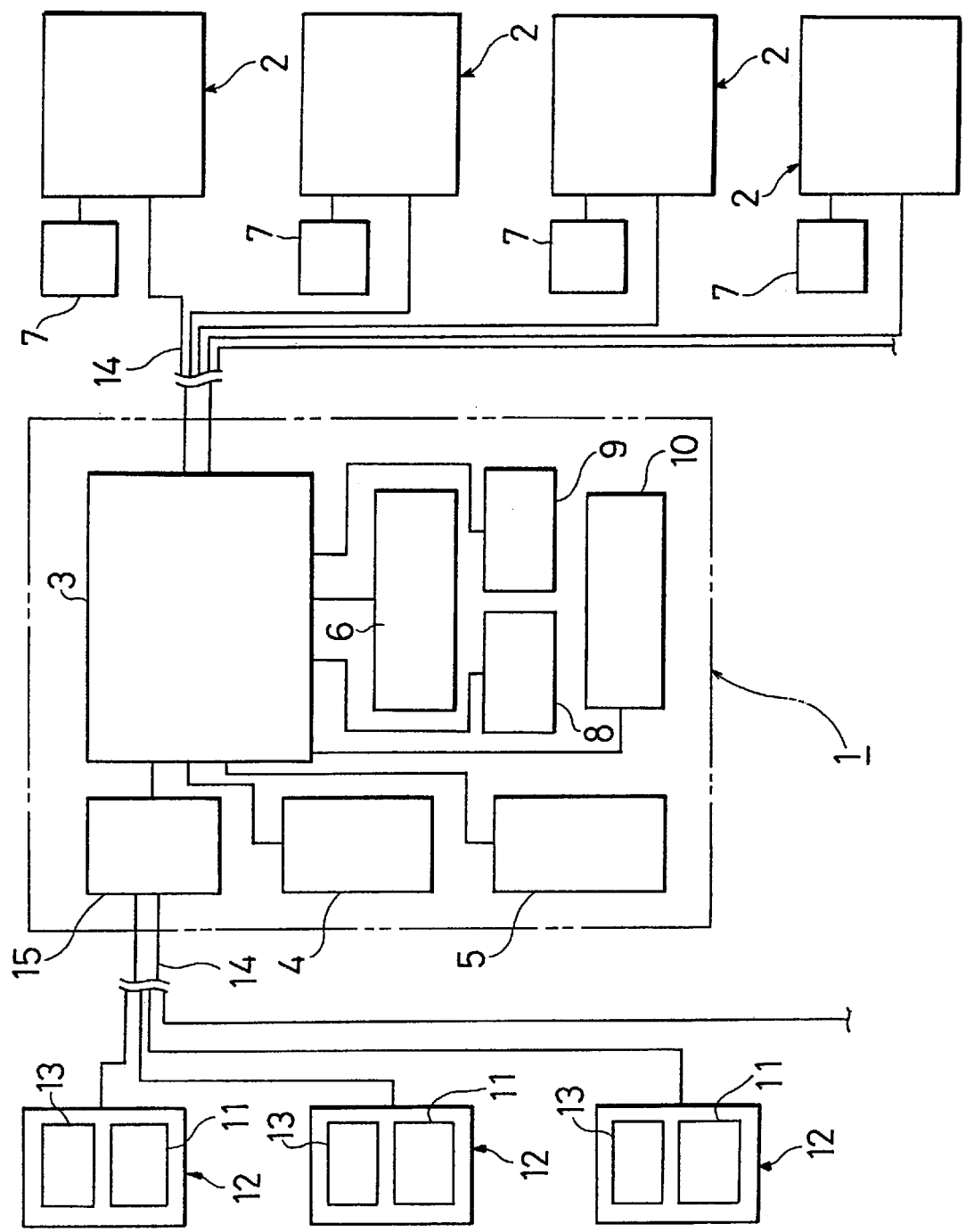
FIG. 1 is a schematic view illustrating an apparatus for practicing a method of controlling reservations for goods and the like in accordance with a first embodiment of the present invention.

In FIG. 1, numeral 1 designates an apparatus for practicing a method of controlling the reservation for various goods and the like, various goods being hereinafter understood to include items of commerce in a general sense including goods or services, of the present invention in accordance with a first embodiment, which apparatus is installed at a specified place within an architecture such as a building having business function.

Numeral 2 designates identical type and/or different type information data control units distributed to specified many places in various districts and the like so that various information data are individually controlled concerning the reservation status, the number of possible reservations and the like for each of various goods on the basis of identification codes set for each of tangible and/or intangible various goods regardless of the kind of business. The control unit 2 is provided individually with a central processing unit (not shown) and an input unit (not shown) for inputting various numerical values and the like to construct information data.

Numeral 3 designates an information data overall control unit which is provided with a central processing unit (not shown) connected through telephone lines (communication means) 14, such as a high speed digital circuit, to the respective information data control units 2 so as to be able to read or store in real time, or at a specified date and time, the information data of the information data control units 2. The information data overall control unit 3 is provided with: an individual data registration unit 4 for setting and registering individual identification means having individual identification codes sequentially set by the information data overall control unit 3 corresponding to each individual data of an unspecified number of the general public set from later-described reservation units 12 which are previously installed in respective general houses and the like, and are connected through general telephone lines (communication means) 14 to a circuit distributor 15; an address registration unit 5 capable of registering communication means for an urgent contact such as telephone number for each individual set and registered; and a reservation data allocation unit 6 for allocating the reservation contents of reserved various goods through the identification codes from the reservation units 12 to a specified information data control unit 2 controlling applicable various goods.

Each of the information data control units 2 is provided with a reservation code setting unit 7 for setting a reservation code to the reservation data including various conditions such as the number of reservations and the delivery date and time of various goods. The reservation data are allocated to a specified information data control unit 2 controlling corresponding various goods applicable to reservation contents by the reservation data allocation unit 6 and sent to the unit 2.

Numeral 8 designates a reservation code sending unit provided in the information data overall control unit 3 for sending the set reservation code through the reservation code setting unit 7 of the information data control units 2 to an individual requesting the reservation. A reservation data control unit 9 receives various urgent information data such as the change or cancellation of reservation data to which a reservation code has been set from at least either the reservation unit 12, on the individual side, or the information data control unit 2 side and can change and/or cancel the contents of the reservation data to which a reservation code has been set.

The information data overall control unit 3 controls change or cancellation of the contents of reservation data in such a manner that at least either the reservation unit 12, provided on the individual side, or the information data control unit 2 is notified through notification means such as voice and display of the fact that various urgent information data have been inputted, before the contents of reservation data are changed or canceled through the reservation data control unit 9, and that the change or cancellation of the contents of reservation data is performed after the confirmation of various urgent information data, and after the receiving of the urgent information acknowledgment data inputted from at least either the reservation unit 12, on the individual side, or the information data control unit 2.

Numeral 10 designates a reservation data changed contents sending unit for actuating the address registration unit 5 when some change occurs in the contents of reservation data, and sending the contents of the changed and/or canceled reservation data to the reservation unit 12 for each of respective individuals.

Numeral 11 designates reservation data changed contents notification units respectively provided in the reservation units 12 for notifying respective individuals of the reservation data sent through the reservation data changed contents sending unit 10, and numeral 13 designates an information display and input unit which is provided in each reservation unit 12 and has no keyboard.

The information display and input unit 13 is provided with a function capable of selecting, as required, and displaying only the required information data at an individual's option by touching a finger to a specified position on a display screen (not shown) through an information offer that at least either of the information data control units 2 or the information data overall control unit 3 sends various information data on tangible and/or intangible various goods controlled thereby through the communication means to the individual side.

Further, each of the reservation units 12 is provided with an individual data output function (not shown) for sending individual data of an unspecified number of the general public to the individual data registration unit 4, and with a function capable of outputting both the identification codes set for each of various goods, and the individual identification means set and registered by the individual data registration unit 4 when various goods are reserved.

The apparatus for controlling reservations for various goods in the first embodiment of the present invention is formed of the above-mentioned configuration, so that the apparatus has an advantage that even where an individual of an unspecified number of the general public performs the reservation for various goods, receptions of all reservations through communication means are allowed to be concentrated to one place to make the reservation simple, and that where there occurs a situation in that the contents and the like of various goods are changed by the reserving party side, as well as even where an emergency situation on the other party side for providing various goods, the apparatus can not only achieve reliably the purpose of the both parties through each unit in real time for 24 hours through no human power, but can also particularly perform reliably the final confirmation for the reservation contents for each individual having established a reservation, and effect centralized control in real time all of reservation data on various goods for each individual of an unspecified number of the general public.

Further, the apparatus for controlling reservations for various goods formed of the above-mentioned configuration is provided with reservation units 12 capable of outputting both the identification codes set for each of various goods, and the individual identification means when various goods are reserved, so that the apparatus has an advantage of establishing simply, reliably and in real time the reservation for each of specified various goods.

Also, the reservation unit 12 is provided with an individual data output function for sending individual data to the individual data registration unit 4, so that the apparatus has an advantage that anyone can not only send simply and instantaneously individual data for each individual to the individual data registration unit 4 to set and register the individual identification means for each individual data, but also establish in real time the reservation for each of specified various goods after the individual identification means have been set and registered.

Further, the reservation unit 12 and the reservation data changed contents notification unit 11 are integrally provided, so that the apparatus has an advantage that the information on not only the reservation for various goods and the change in the contents of various reserved goods, but also the change in the contents sent from the party side for providing various goods following a reservation can be understood in real time, at any time and in any place.

Also, the reservation unit 12 is provided with the information display and input unit 13 having no keyboard, so that the apparatus has an advantage in operability that the apparatus is most suitable particular for the use by patients in bed or elder persons.

Further, the individual data registration unit 4, the address registration unit 5, the reservation data allocation unit 6, the reservation code sending unit 8, the reservation data control unit 9, and the reservation data changed contents sending unit 10 of the apparatus for controlling reservations for various goods having the above-mentioned configuration, are provided in the information data overall control unit 3 so that the apparatus has an advantage that even where the information data control units 2 for controlling individually various goods are linked to each other so as to be multiply-controlled, respective information data control units 2 can be individually controlled by the information data overall control unit 3 without mounting special hardware to each of the identical and/or different type information data control units 2.

Further, the various communication means are general telephone lines 14 and high-speed telephone lines 14 using high speed digital circuits and the like, so that the apparatus has an advantage that the reservation for various goods can be instantaneously and reliably established only by sending in real time, at any time and in any place, the reservation for specified various goods to the information data overall control unit 3 when various goods are reserved.

Further, before the contents of reservation data are changed or canceled, at least either the reservation unit 12 or the information data control units 2 is notified of the fact that various urgent information data have been inputted, so that the apparatus has an advantage in that anyone can know reliably and in real time the change or cancellation of the reservation contents.

Further, the change or cancellation of the contents of reservation data is performed following the reception of the urgent information acknowledgment data inputted from at least either the reservation unit 12 or the information data control units 2 after various urgent information data are inputted, so that the apparatus has an advantage that the change or cancellation of the contents of all reservation data can be performed by decision-making.

Further, at least either of the information data control unit 2 or the information data overall control unit 3 sends various information data on tangible and/or intangible various goods controlled thereby through the communication means to the individual side to provide the information, so that the apparatus has an advantage in that the individuals, such as an unspecified number of the general public, can know simultaneously and in real time the information on various goods.

Further, the information data are displayed on the reservation unit 12 by personal decision-making, so that the apparatus has an advantage that the information on various goods required for each individual can be obtained efficiently in a short time and without waste.

Also, where the flow of the reservation for various goods sequentially processed through the above-mentioned units is, for example, such that all reservations for various goods issued through the communication means from each individual are inputted into the information data overall control unit 3, and thereafter the information data on various goods applicable to a reservation are stored in the information data overall control unit 3, a reservation code is set to each of reserved various goods to notify the individual, and the reservation code and the reservation data are sent to the information data control unit 2 for controlling applicable various goods to store. Where the information data on various goods applicable to the reservation are not stored in the information data overall control unit 3, the information data control unit 2 for controlling applicable various goods is notified of the effect, and the information data control unit 2 sets a reservation code to the reservation data on various goods and sends the code to the information data overall control unit 3 from which an individual may be notified of the reservation code for reserved various goods, and in this case, there exists an advantage in that all of reservation data on various goods for each individual of an unspecified number of the general public can be controlled centrally and in real time.

Figure 2:
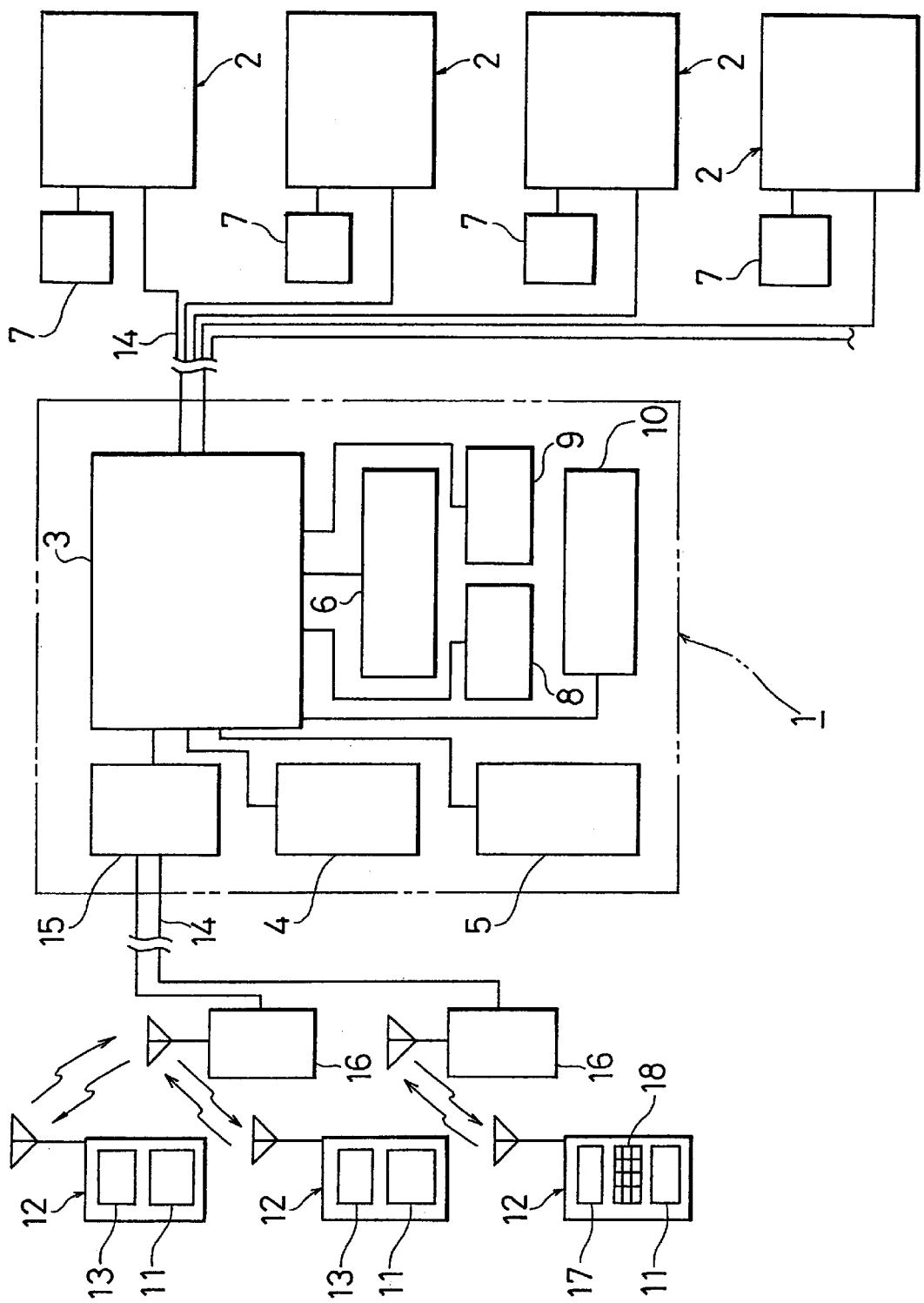
FIG. 2 is a schematic view illustrating an apparatus for practicing a method of controlling reservations for goods and the like in accordance with a second embodiment of the present invention.

Although in the above first embodiment, the reservation unit 12 is the so-called base station type which is previously installed in a general house and the like, and connected to the circuit distributor 15 connected through general telephone lines (communication means) to the information data overall control unit 3, the reservation unit 12 in the present invention is not always limited to the base station type. For example, as shown in FIG. 2, the reservation unit 12 has the information display and input unit 13 having various functions, and the reservation data changed contents notification unit 11 as described in the first embodiment, and may be configured so as to be portable and capable of communicating directly via electromagnetic waves to a data transmitter-receiver unit 16 provided in the information data overall control unit 3. The reservation unit 12 in the portable configuration has a battery (not shown) as a drive power source The reservation unit 12 may be not always provided with the information display and input unit 13 having not an input key (keyboard). For example, a display screen 17 using LCD's and the like and a specified number of required input keys may be provided instead of the information display and input unit 1. Furthermore, the reservation unit 12 including the information display and input unit 13, as in the former, and the reservation unit 12 including the display screen 17 and a specified number of required input keys may optionally be used in combination. Accordingly, there exists an advantage that the user can select a more easy-to-operate system thereof.

Figure 3:
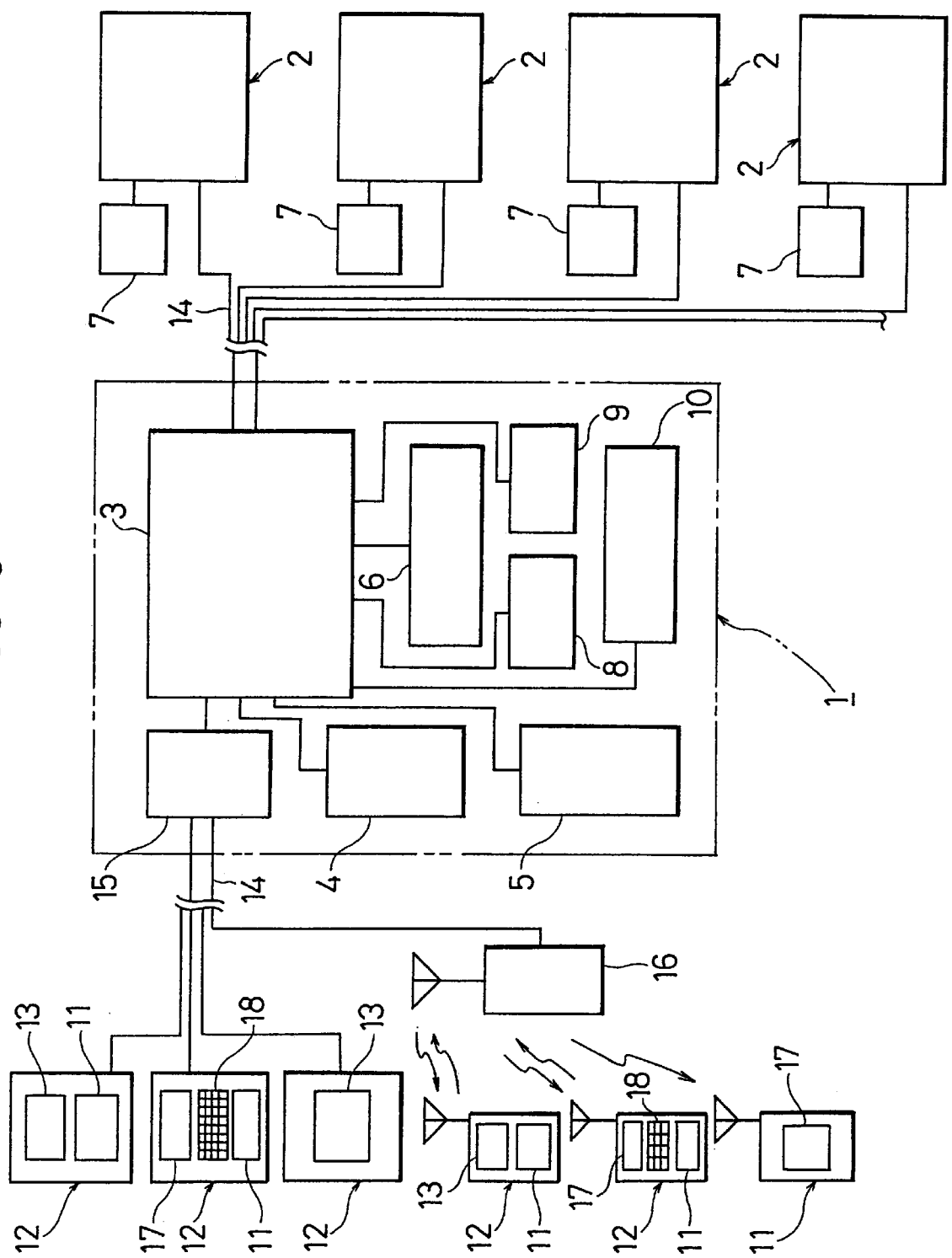
FIG. 3 is a schematic view illustrating an apparatus for practicing a method of controlling reservations for goods and the like in accordance with another embodiment of the present invention, in which the apparatus is provided in a mobile body in different manners.

Although in the above-mentioned embodiments, the reservation units 12 and the information data overall control unit 3 use communication means of either the wire-type general telephone lines 14 or the wireless-type data transmitter-receiver unit 16 using electromagnetic waves, they are not always limited to either of the communication means, and for example, as shown in FIG. 3, when the reservation control apparatus is operated, the communication means in which both systems are present may be used. Further, the reservation unit 12 including the information display and input unit 13 having no input key as the base station type and the reservation data changed contents notification unit 11, and the reservation unit 12 including the display screen 17 and the input keys 18 instead of the information display and input unit 13 and including the reservation data changed contents notification unit 11, and the reservation unit 12 as the base station type including only the information display and input unit 13 may be used. The portably-configured reservation unit 12 including the information display and input unit 13 having no input key and the reservation data changed contents notification unit 11, and the portably-configured reservation unit 12 including the display screen 17 and the input keys 18, instead of the information display and input unit 13, and including the reservation data changed contents notification unit 11, and the portably-configured reservation unit 12 including only the function of the reservation data changed contents notification unit 11 having simply the display screen 17 to receive the electromagnetic waves emitted from the data transmitter-receiver unit 16 all may be present and used in combination. In order to control reliably the reservation for various goods and the change or cancellation of the reservation contents, both the reservation unit 12 as the base station type provided with only the information display and input unit 13 and the reservation unit 12 which is portable, has the display screen 17, and has only the function of the reservation data changed contents notification unit 11 may be used as a set. It will be appreciated that a case where the reservation unit 12 for issuing reservation is provided with the reservation data changed contents notification unit 11 may exist, or a case where the reservation unit 12 and the reservation data changed contents notification unit 11 are separately provided may exist, and the combination of both cases may exist without limitation.

Although, in the above-mentioned embodiments, corresponding to each of individual data of an unspecified number of the general public sent from the reservation unit 12, individual identification means having an individual identification code set sequentially in the information data overall control unit 3 are set and registered, the individual identification means may be not always set by the individual data and the individual identification code. For example, the individual identification means may be set by the individual data to be sequentially inputted through various communication means connected to the information data overall control unit 3 and by an individual password (which is set individually by itself) set together with the individual data In such case there exists an advantage that even in either the former case or the latter case, anyone can not only send simply and instantaneously the individual data for each individual to the individual data registration unit 4 so as to set and register the individual identification means for each individual data, but also simultaneously set and register either the individual password or the individual identification code, either of which becomes a key code, to construct instantaneously an individual security system.

Further, where the individual identification means are, for example, signals which are obtained by identifying and encoding at least part of the human body of an individual sent together with the individual data sequentially inputted through various communication means connected to the information data overall control unit 3, there exists an advantage that a more reliable security system can be constructed without using entirely the principal confirmation medium such as various identification cards, and at the same time, various goods can be silently sent/received, and particularly, there occurs another advantage in a transaction in that a tie-up with various financial institutions can be satisfactorily performed.

Further, the reservation order of the reservation control apparatus practicing the method of controlling the reservation for goods in the present invention is not limited to the above-mentioned embodiments. For example, the present invention includes any reservation control apparatus which can perform the following:

set and register individual identifying means for each individual corresponding to individual data of an unspecified number of the general public; thereafter reserve tangible and/or intangible various goods and the like controlled by the information data control units 2 from an individual whose individual identifying means have been set and registered, through the communication means; thereafter set a reservation code to the reservation data for each of various goods reserved and notifying the individual; thereafter receive various urgent information data, such as the change or cancellation of the reservation data to which the reservation code has been set from at least either the individual side or the information data control unit 2 side, and change or cancel the contents of the reservation data; and thereafter send through the communication means the contents of the reservation data to notify the individual.

Furthermore, the information data overall control unit 3 need not be interposed. Each individual may directly send the individual data and the like to respective information data control units 2 for controlling, individually, various goods so as to be given a reservation code to which various conditions, such as goods receiving data and quantity have been set. Accordingly, there exists an advantage that where there occurs a situation wherein the contents and the like of various goods, such as reserved goods and services, are changed by the reserving party side, as well as where an emergency situation, such as various troubles, occurs on the other party side for providing various goods, such as reserved goods and services, the apparatus can not only achieve smoothly the purpose of the both parties in real time for 24 hours, but particularly also perform reliably the final confirmation for the reservation contents for each individual having made a reservation.

Further, the reservation order of the reservation control apparatus practicing the method of controlling the reservation for goods in the present invention is not limited to the above-mentioned embodiments. The reservation for various goods may be established by using the reservation code previously set for each of tangible and/or intangible various goods controlled by the information data control units 2. The reservation in such case is established by the following:

setting and registering individual identifying means for each individual corresponding to individual data of an unspecified number of the general public; thereafter sending a reservation code previously set for each of tangible and/or intangible various goods controlled by the information data control units 2 through communication means from an individual whose individual identifying means have been set and registered to reserve various goods; thereafter receiving various urgent information data, such as the change or cancellation of the reservation data for each of various goods reserved, from at least either the individual side or the information data control unit 2, and changing or canceling the contents of the reservation data; and thereafter sending through the communication means the contents of the reservation data to notify the individual.

Accordingly, there exists an advantage that where there occurs a situation in that the contents and the like of various goods such as reserved goods and services are changed by the reserving party side, as well as even where an emergency situation, such as various troubles, occurs on the other party side for providing various goods such as reserved goods and services, the apparatus can not only achieve reliably the purpose of the both parties in real time for 24 hours, but can also perform reliably and smoothly the final confirmation for the reservation contents for each individual having established reservation.

Thus, as a procedure of reserving various goods by using the reservation code previously set for each of tangible and/or intangible various goods controlled by the information data control units 2, the procedure in the following case may be also considered.

That is, the reservation order of the reservation control apparatus may be such that all reservation codes sent through the communication means from each individual and previously set for each of various goods are inputted into the information data overall control unit 3, and thereafter, where the information data on various goods applicable to the reservation codes have been stored in the information data overall control unit 3, the reservation is established by the information data overall control unit 3, thereafter the reservation codes are sent to a specified information data control unit 2 controlling various reserved goods and the like to store them; where the information data on various goods applicable to the reservation codes have not been stored in the information data overall control unit 3, the information data control unit 2 controlling various goods applicable to the reservation codes is notified of the effect and performs the reservation, and thereafter the information data on various goods applicable to the reservation codes are sent from the information data control unit 2 to the information data overall control unit 3. It will be appreciated that even this case has the above-mentioned series of advantages.

Further, it will be appreciated that in the above-mentioned embodiments, the specific configuration of the communication means is not limited to the telephone lines and may use other wire communication and/or wireless communication. Where an electromagnetic wave is used for the communication means, the type of the electromagnetic wave transmitted and received may be an amplitude modulated or a frequency modulated wave, or any of short, medium and micro wave.

Further, although in the above-mentioned embodiments the reservation control apparatus 1 is configured such that the information data overall control unit 3 includes the individual data registration unit 4, the address registration unit 5, the reservation data allocation unit 6, the reservation data control unit 9 and the reservation data changed contents notification unit 11, and such that the information data control unit 2 is provided with the reservation code setting unit 7 and the reservation code sending unit 8, it will be appreciated that the apparatus is not limited to the above-mentioned configuration. For example, the reservation code setting unit 7 and the reservation code sending unit 8 may be controlled by the information data overall control unit 3, and the existing place and control route of various units configuring the information data overall control unit 3 and the information data control unit 2 are not so limited.

Figure 4A:
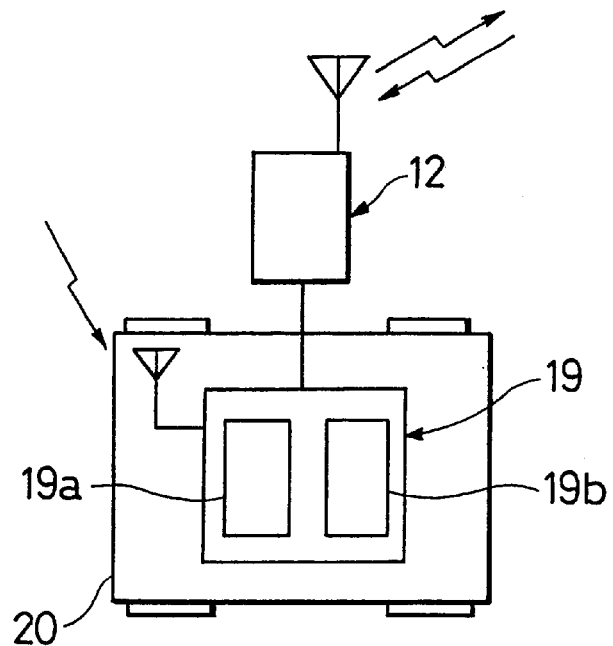
FIGS. 4A, 4B, 5A and 5B are schematic views illustrating an apparatus for practicing a method of controlling reservations for goods and the like in accordance with still another embodiment of the present invention, in which the apparatus is provided in a mobile body in different manners.

Further, as shown in FIG. 4A, the reservation unit 12 may be provided with a navigation unit 19 including position detector means using a position detection unit 19a, such as the GPS system, and an autonomous navigation system and hybrid system for detecting the current position of a mobile body 20 such as a vehicle and position disclosure means for disclosing the position of the mobile body 20 detected through the position detector means by a monitor 19b and the like. Accordingly, there exists an advantage that the reservation of tangible and/or intangible goods can be simply and reliably established in real time for 24 hours from the mobile body 20 such as a vehicle, and even where there occurs a situation in that the contents and the like of various goods, such as reserved goods and services, are changed by the reserving party side, as well as even where an emergency situation, such as various troubles, occurs on the other party side for providing various goods, such as reserved goods and services, change of reserved various goods can be immediately performed in the mobile body 20 such as a vehicle, and at the same time, the confirmation for the reservation contents of changed various goods can be instantaneously and reliably performed. Furthermore, where the above-mentioned reserved goods are, for example, reservations for various accommodations for hotels and the like, and various restaurants reservations and the like, anyone reserving the goods can be easily and reliably guided through the navigation unit 19 provided within the mobile body 20 to the intended accommodation or restaurant, and can immediately select and reserve various accommodations for hotels and the like, or various restaurants and the like located in a specified area such as a final intended destination of the mobile body 20 through the navigation unit 19.

Figure 4B:
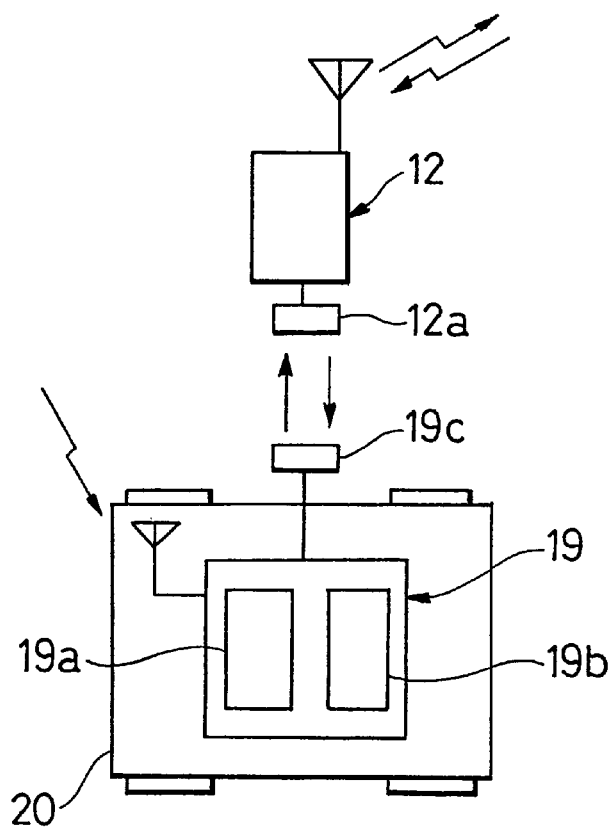

Further, as shown in FIG. 4B, the reservation unit 12 and the navigation unit 19 may be configured removably through connection units 12a and 19c provided on both the above units, respectively. In such case, there exists an advantage in goods popularization that the reservation unit 12 can be simply mounted to, for example, a vehicle manufacturer's genuine navigation units 19 or generally available various navigation units 19 and immediately used without performing any troublesome modification and the like.

Figure 5A:
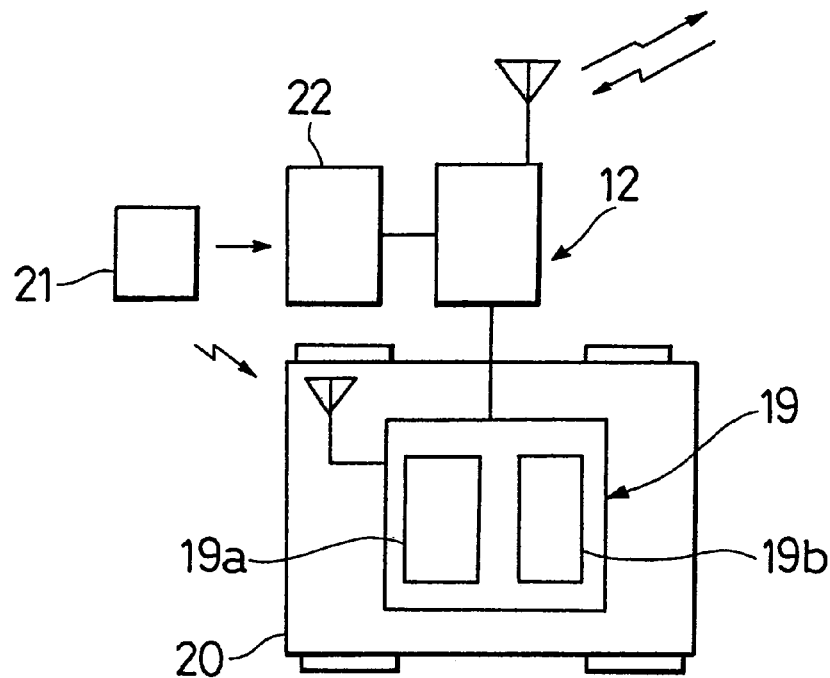

Further, as shown in FIG. 5A, the reservation unit 12 may be provided with a information take-in unit 22 capable of taking in the information on specified goods and like from a storage medium 21, such as a magnetic disk and a magnetic tape for storing the information on tangible and/or intangible various goods to which reservation codes have been set. With such a configuration, there exists an advantage that the information on various goods can be widely popularized through the storage medium 21 to general consumers and the like, and at the same time, the change or addition of the information contents can be coped with by sequential version updates, and further, with the storage medium 21 made available for each field of various goods, the reserving party can select the storage medium 21 matched with the purpose on the side of reserving various goods to utilize it efficiently. However, the reservation unit 12 is not always provided with the information take-in unit 22, and the information take-in unit 22 may be provided on the navigation unit 19, and in a word, it is sufficient that the information take-in unit 22 is provided on at least either the reservation unit 12 or the navigation unit 19.

Figure 5B:
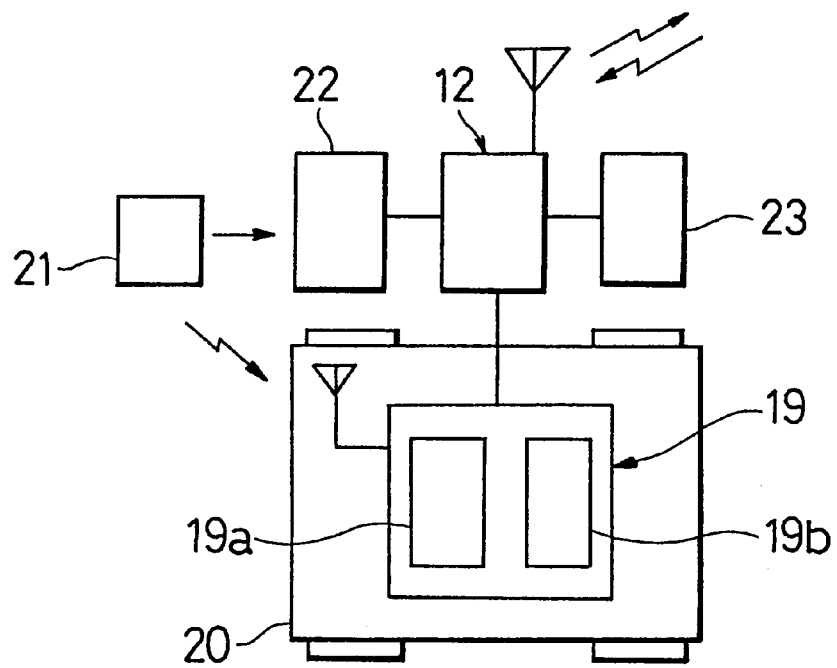

Further, as shown in FIG. 5B, the reservation unit 12 may be provided with an information data rewrite unit 23 capable of rewriting the information within the storage medium 21, and in this case, there exists an advantage that the user side can simply perform editing and the like of the information within the storage medium 21 according to the purpose and usage on the reserving side. For example, the information data rewrite unit 23 may be configured so as to be able to rewrite the information within the storage medium 21 through a specified rewrite signal (not shown) sent from the information data overall control unit 3, and in this case, although there exists an advantage that the change or addition of the information contents within the storage medium 21 can be done automatically and in real time to the latest contents without making available sequentially an updated storage medium 21 for the change or addition of the information contents by the reserving party side or without any trouble of rewriting. However, the reservation unit 12 need not always be provided with the information data rewrite unit 23, and the information data rewrite unit 23 may be provided on the navigation unit 19, and in a word, it is sufficient that the information data rewrite unit 23 is provided on at least either the reservation unit 12 or the navigation unit 19.

The specific installation place, structure and function of units configuring the reservation control apparatus practicing the method of controlling the reservation for goods and the like of the present invention are not limited, and further, all the specific configurations of members configuring other units can be also arbitrarily changed within the scope intended by the present invention. The scope of utilizing the reservation control apparatus capable of being used in real time for 24 hours is also not limited, and for example, the apparatus is applicable to all reservations for tangible and/or intangible various goods including: the reservation for medical examination or accommodations of hospitals and the like, a reservation for various tickets, a reservation for events, the reservation for goods purchase, a reservation for services related to transportation, as well as a reservation in a service industry such as a reservation for collection/distribution of home delivery and the like, a reservation for a seat or meal delivery related to eating and drinking, a reservation for design drawings in various fields or for the execution of a civil/architectural work related to construction, and a reservation for a lecture, lesson schedule and the like related to various private classes and schools.

Further, it will be appreciated that the reservation unit 12 or the reservation data changed contents notification unit 11 used in the reservation control apparatus 1 may be provided integrally to a communication apparatus such as various general cellular phones and radio pagers; further, the information data sent to the individual side establishing a reservation are not always limited to only the data on the reservation status and the number of possible reservations for each of various goods; and for example, various information in advance such as the information on various events to be performed next time and on new goods which are not directly related to the reservation at present time may be sent continuously or discontinuously to the individual side. In such a case, the opinion or impression of each individual may be transmitted through a special identification code to at least either a specified information data control unit or the information data overall control unit, and in this case, there exists a great advantage that, for example, the opinion from specific membership organizations and general consumers on the basis of the information data thus sent can be heard instantaneously and in real time for 24 hours. Accordingly, the apparatus can be used to obtain valuable data on specified enterprises and the like that plan and operate various events and provide new goods.

Although in the above-mentioned embodiments, the individual data have been intended for a natural person of an unspecified number of the general public, it will be appreciated that the individual data may be intended for corporations of various enterprises and the like.

This specification is by no means intended to restrict the present invention to the preferred embodiments set forth therein. Various modifications to the method and apparatus of the present invention, as described herein, may be made by those skilled in the art without departing from the spirit and scope of the present invention as defined in the appended claims.

What is claimed is:

1. A method of managing reservations of various items of commerce, the various items of commerce including at least one of goods and services, in which the reservations are placed by individuals from a reserving party side for acceptance from a providing party side by at least one provider of said various items of commerce, the method comprising the steps of:

setting and registering individual identification means pertinent to individual data of an unspecified number of individuals of the general public;

receiving reservation data for particular ones of the various items of commerce communicated by a particular one of said individuals for whom the individual identification means have already been set and registered;

setting a reservation code to the reservation data representative of each of the particular ones of the various items of commerce reserved and notifying said particular one of said individuals that said reservation code has been set;

receiving modifying information data input from one of said reserving party side and said performing party side indicating a desired revision of the reservation data to which the reservation code has been set, the desired revision including one of change and cancellation, sending a notification indicating receipt of the modifying information data from one of the reserving party side and the performing party side prior to performing the desired revision of the reservation data, said notification being sent to a remaining one of the reserving party side and the performing party side affected by said desired revision;

performing the desired revision of reservation data after confirmation of said modifying information data, and on condition of receipt of modifying information acknowledgement data inputted from said remaining one of the reserving party side and the performing party side; and sending revised reservation data to notify said remaining one of said reserving party side and said performing party side to enable mutual performance by said reserving party side and said performing party side of the items of commerce represented by the revised reservation data.

2. A method of managing reservations according to claim 1, wherein:

information data control units are distributed to specified places so that various information data corresponding to the particular ones of said various items of commerce can be controlled thereby; and each of the information data control units is centralizedly controlled, one of in real time and for a specified date, by an information data overall control unit capable of performing at least one function of reading and storing the various information data of each of said information data control units.

3. A method of managing reservations according to claim 2, wherein:

all reservations for the particular ones of said various items of commerce are sent through communication means from each said particular one of said individuals and are inputted into ones of the information data overall control units; and thereafter:

where the information data on the particular ones of said various items of commerce applicable to reservation of same have been stored in said information data overall control unit, a reservation code for each of the particular ones of said various items of commerce is set to notify each said particular one of said individuals, and at the same time, the reservation code and the reservation data are sent to the information data control unit controlling applicable ones of the various ones of said items of commerce to store them; and where the information data on the various ones of said items of commerce applicable to reservation of same have not been stored in the information data overall control unit, the information data control unit controlling applicable ones of the various ones of said items of commerce is notified of the effect, and the reservation code is set to the reservation data on the various ones of said items of commerce by the information data control unit to send the reservation code to the information data overall control unit, thereby notifying each said particular one of said individuals of the reservation code for reserved ones of the particular ones of said various items of commerce from said information data overall control unit.

4. A method of managing reservations according to claim 2, wherein:

all reservation codes received from each of said individuals and previously set for each of are inputted into the information data overall control unit; and thereafter:

where the information data on the particular ones of said various items of commerce applicable to the reservation codes have been stored in said information data overall control unit, the reservation is performed by the information data overall control unit, and thereafter said reservation codes are sent to a specified information data control unit controlling ones of said various items of commerce to store them; and where the information data on the particular ones of said various items of commerce applicable to the reservation codes have not been stored in the information data overall control unit, the information data control unit controlling the particular ones of said items of commerce applicable to the reservation codes is notified of the effect and performs reservation, and thereafter the information data on the particular ones of said items of commerce applicable to the reservation codes are sent from said information data control unit to the information data overall control unit.

5. A method of managing reservations of various items of commerce, the various items of commerce including at least one of goods and services, in which the reservations are placed by individuals from a reserving party side for acceptance from a providing party side by at least one provider of said various items of commerce, the method comprising the steps of:

setting and registering individual identification means pertinent to individual data of an unspecified number of particular individuals of the general public;

sending a previously set reservation code corresponding to particular ones of said various items of commerce, and reserving the particular ones of said various items of commerce from the particular individuals whose individual identifying means have been set and registered;

receiving modifying information data input from one of said reserving party side and said performing party side indicating a desired revision of the reservation data of various reserved ones of said various items of commerce, the desired revision including one of change and cancellation;

sending a notification indicating receipt of the modifying information data from one of the reserving party side and the performing party side prior to performing the desired revision of the reservation data, said notification being sent to a remaining one of the reserving party side and the performing party side affected by said desired revision;

performing the desired revision of reservation data after confirmation of said modifying information data, and on condition of receipt of modifying information acknowledgement data inputted from said remaining one of the reserving party side and the performing party side; and sending revised reservation data to notify said remaining one of said reserving party side and said performing party side to enable mutual performance by said reserving party side and said performing party side of the items of commerce represented by the revised reservation data.

6. A method of managing reservations according to claim 5, wherein:

information data control units are distributed to specified places so that various information data corresponding to the particular ones of said various items of commerce can be controlled thereby; and each of the information data control units is centralizedly controlled, one of in real time and for a specified date, by an information data overall control unit capable of performing at least one function of reading and storing the various information data of each of said information data control units.

7. A method of managing reservations according to claim 6, wherein:

all reservations for various goods and the like sent through said communication means from each individual are inputted into the information data overall control unit; and thereafter:

where the information data on the particular ones of said various items of commerce applicable to reservation have been stored in said information data overall control unit, a reservation code for each of the particular ones of said various items of commerce reserved is set to notify the particular one of said individuals and at the same time, the reservation code and the reservation data are sent to the information data control unit controlling applicable ones of the particular ones of said various items of commerce to store them; and where the information data on the particular ones of said various items of commerce applicable to reservation have not been stored in the information data overall control unit, the information data control unit controlling applicable ones of the particular ones of said various items of commerce is notified of the effect, and the reservation code is set to the reservation data on the particular ones of said various items of commerce by the information data control unit to send the reservation code to the information data overall control unit, thereby notifying the particular one of said individuals of the reservation code for reserved ones of said various items of commerce from said information data overall control unit.

8. A method of managing reservations according to claim 6, wherein:

all reservation codes sent through said communication means from each individual and previously set for each of the particular ones of said various items of commerce are inputted into the information data overall control unit; and thereafter:

where the information data on the particular ones of said various items of commerce applicable to the reservation codes have been stored in said information data overall control unit, the reservation is performed by the information data overall control unit, and thereafter said reservation codes are sent to a specified information data control unit controlling the particular ones of said various items of commerce to store them; and where the information data on the particular ones of said items of commerce to the reservation codes have not been stored in the information data overall control unit, the information data control unit controlling the particular ones of said various items of commerce applicable to the reservation codes is notified of the effect and performs the reservation, and thereafter the information data on ones of the particular ones of said various items of commerce applicable to the reservation codes are sent from said information data control unit to the information data overall control unit.

9. An apparatus for managing reservations of various items of commerce, the items of commerce including at least one of goods and services, in which the reservations are placed by individuals from a reserving party side for acceptance from a providing party side by at least one provider of said various items of commerce, comprising:

an information data control unit group distributed to specified places so that various information data are to be individually controlled, including reservation status and number of possible reservations for each of the various items of commerce on the basis of identification codes set for each of particular ones of said various items of commerce, said information data control unit group being comprised of one of identical type and different type information data control units;

an information data overall control unit capable of at least one function of reading and storing the information data of said each information data control unit in one of real time and for each specified date and time;

an individual data registration unit for setting and registering individual identification means pertinent to each individual data of an unspecified number of individuals of the general public;

an address registration unit capable of registering communication means for an urgent contact including a telephone number for each individual set and registered;

a reservation data allocation unit for allocating reservation data representative of reservation contents of the particular ones of said various items of commerce through the individual identification means and using individual identification codes confirmed as a principal to a specified information data control unit controlling applicable ones of the particular ones of said various items of commerce;

reservation code setting units for setting a reservation code to the reservation data including a number of reservations and a delivery date and time of ones of the various items of commerce sent to the information data control units;

a reservation code sending unit for sending said reservation code to the reserving party side;

a reservation data control unit which receives modifying information data input from one of said reserving party side and said performing party side indicating a desired revision of reservation data to which a reservation code has been set from at least one of the reserving party side and the performing party side, the desired revision including one of change and cancellation, and can revise the contents of the reservation data to which a reservation code has been set;

a reservation data changed contents sending unit for actuating said address registration unit when some change occurs in the contents of reservation data, and sending the contents of revised reservation data through specified communication means to respective ones of said particular ones of said individuals;

reservation data changed contents notification units for notifying said respective ones of said particular individuals of the reservation data sent through said reservation data changed contents sending unit; and a reservation unit on the reserving party side for outputting both the identification codes set for each of the particular ones of said items of commerce, and the individual identification means when the particular ones of said various items of commerce are reserved;

said information data overall control unit controlling the change or cancel of the contents of reservation data in such a manner that at least one of the reservation unit and the information data control unit is notified through notification means of the fact that modifying information data have been inputted, before the contents of reservation data are revised through the reservation data control unit, and that the revision of the contents of reservation data is performed after confirmation of the modifying information data and on condition of receipt of the modifying information acknowledgement data inputted from at least one of the reservation unit and the information data control unit.

10. An apparatus for managing reservations according to claim 9, wherein said reservation unit is provided with individual data output means for sending individual data to the individual data registration unit.

11. An apparatus for managing reservations according to claim 9, wherein said reservation unit and said reservation data changed contents notification unit are integrally provided.

12. An apparatus for managing reservations of various items of commerce, the items of commerce including at least one of goods and services, in which the reservations are placed by individuals from a reserving part side for acceptance from a providing party side by at least one provider of said various items of commerce, comprising:

an information data control unit group distributed to specified places so that various information data are to be individually controlled, including reservation status and number of possible reservations for each of the various items of commerce on the basis of identification codes set for each of particular ones of said various items of commerce, said information data control unit group being comprised of one of identical type and different type information data control units, an information data overall control unit capable of at least one function of reading and storing the information data of said each information data control unit in one of real time and for each specified date and time, an individual data registration unit for setting and registering individual identification means pertinent to each individual data of an unspecified number of individuals of the general public;

an address registration unit capable of registering communication means for an urgent contact including a telephone number for each individual set and registered;

a reservation data allocation unit for allocating reservation data representative of reservation contents of the particular ones of said various items of commerce through the individual identification means and using individual identification codes confirmed as a principal to a specified information data control unit controlling applicable ones of the particular ones of said various items of commerce;

reservation code setting units for setting a reservation code to the reservation data including a number of reservations and a delivery date and time of ones of the various items of commerce sent to the information data control units;

a reservation code sending unit for sending said reservation code to the reserving party side;

a reservation data control unit which receives modifying information data input from one of said reserving party side and said performing party side indicating a desired revision of reservation data to which a reservation code has been set from at least one of the reserving party side and the performing party side, the desired revision including one of change and cancellation, and can revise the contents of the reservation data to which a reservation code has been set;

a reservation data changed contents sending unit for actuating said address registration unit when some change occurs in the contents of reservation data, and sending the contents of revised reservation data through specified communication means to respective ones of said particular ones of said individuals;

reservation data changed contents notification units for notifying said respective ones of said particular individuals of the reservation data sent through said reservation data changed contents sending unit;

said reserving party side being provided with reservation units capable of outputting an identification code set for each of said various items of commerce and of individual identification means when the particular ones of said various items of commerce are reserved; and at least one of said reservation unit and said reservation data changed contents notification unit is configured so as to be portable.

13. An apparatus for managing reservations of various items of commerce, the items of commerce including at least one of goods and services, in which the reservations are placed by individuals from a reserving party side for acceptance from a providing party side by at least one provider of said various items of commerce, comprising:

an information data control unit group distributed to specified places so that various information data are to be individually controlled, including reservation status and number of possible reservations for each of the various items of commerce on the basis of identification codes set for each of particular ones of said various items of commerce, said information data control unit group being comprised of one of identical type and different type information data control units;

an information data overall control unit capable of at least one function of reading and storing the information data of said each information data control unit in one of real time and for each specified date and time;

an individual data registration unit for setting and registering individual identification means pertinent to each individual data of an unspecified number of individuals of the general public;

an address registration unit capable of registering communication means for an urgent contact including a telephone number for each individual set and registered;

a reservation data allocation unit for allocating reservation data representative of reservation contents of the particular ones of said various items of commerce through the individual identification means and using individual identification codes confirmed as a principal to a specified information data control unit controlling applicable ones of the particular ones of said various items of commerce;

reservation code setting units for setting a reservation code to the reservation data including a number of reservations and a delivery date and time of ones of the various items of commerce sent to the information data control units;

a reservation code sending unit for sending said reservation code to the reserving party side;

a reservation data control unit which receives modifying information data input from one of said reserving party side and said performing party side indicating a desired revision of reservation data to which a reservation code has been set from at least one of the reserving party side and the performing party side, the desired revision including one of change and cancellation, and can revise the contents of the reservation data to which a reservation code has been set;

a reservation data changed contents sending unit for actuating said address registration unit when some change occurs in the contents of reservation data, and sending the contents of revised reservation data through specified communication means to respective ones of said particular ones of said individuals;

reservation data changed contents notification units for notifying said respective ones of said particular individuals of the reservation data sent through said reservation data changed contents sending unit;

said reserving party side being provided with reservation units capable of outputting an identification code set for each of said various items of commerce and of individual identification means when the particular ones of said various items of commerce are reserved; and said reservation unit being provided on a navigation unit including means for detecting the position of a mobile body and means for disclosing the position of the mobile body detected through said position detection means.

14. An apparatus for managing reservations according to claim 13, wherein said reservation unit is configured so as to be removably provided on the navigation unit.

15. An apparatus for managing reservations according to claim 13, further comprising an information take-in unit capable of taking in the information on specified ones of said various items of commerce from a storage medium having stored the information on the particular ones of said various items of commerce to which the reservation codes are set provided on at least one of said reservation unit and or said navigation unit.

16. An apparatus for managing reservations according to claim 13, further comprising an information data rewrite unit capable of rewriting the information within the storage medium provided on at least one of said reservation unit and said navigation unit.

17. An apparatus for managing reservations according to claim 16, wherein said information data rewrite unit is configured so as to be able to rewrite the information within the storage medium through a specified rewrite signal sent from the information data overall control unit.

18. An apparatus for managing reservations according to claim 9, wherein said reservation unit is provided with an information display and input unit having no keyboard.

19. An apparatus for managing reservations according to claim 9, wherein said individual data registration unit, said address registration unit, said reservation data allocation unit, said reservation code sending unit, said reservation data control unit and said reservation data changed contents sending unit are provided on the information data overall control unit.

20. An apparatus for managing reservations according to claim 9, wherein said individual identification means are at least one of passwords sent together with individual data to be sequentially inputted through various communication means connected to the information data overall control unit and individual identification codes set sequentially on the providing party side for individual data.

21. An apparatus for managing reservations according to claim 9, wherein said individual identification means are signals encoded by identifying of at least part of individual human body information sent together with individual data sequentially inputted through various communication means connected to the information data overall control unit.

22. An apparatus for managing reservations according to claim 9, wherein said various communication means are telephone lines using at least one of wire communication and wireless communication.

* * * * *